United States Patent [19]

Newcomb

[11] 4,209,121
[45] Jun. 24, 1980

[54] ELECTRONIC BIT GAGING

[75] Inventor: Alan L. Newcomb, Rancho Palos Verdes, Calif.

[73] Assignee: Smith International, Inc., Newport Beach, Calif.

[21] Appl. No.: 953,388

[22] Filed: Oct. 23, 1978

[51] Int. Cl.² .......................................... B23K 37/04
[52] U.S. Cl. .............................. 228/49 R; 228/103; 219/121 EB; 33/178 B; 324/207; 324/243
[58] Field of Search ................... 228/102, 103, 182, 9, 228/10, 49 R; 219/121 EB, 121 EM; 33/178 R, 178 B, 178 E; 29/407; 324/207, 243

[56] References Cited

U.S. PATENT DOCUMENTS

| | | | |
|---|---|---|---|
| 2,805,677 | 9/1957 | Baird | 324/207 |
| 3,392,829 | 7/1968 | Keinanen | 324/243 |
| 3,732,608 | 5/1973 | Knopf | 29/407 |
| 3,837,198 | 9/1974 | Higgins | 29/407 X |
| 3,907,191 | 9/1975 | Liehte | 228/182 |
| 4,054,772 | 10/1977 | Liehte | 228/186 X |
| 4,098,448 | 7/1978 | Sciaky et al. | 228/102 |

*Primary Examiner*—Francis S. Husar
*Assistant Examiner*—K. J. Ramsey
*Attorney, Agent, or Firm*—Robert G. Upton

[57] ABSTRACT

A method and apparatus is disclosed for monitoring the gage diameter of a rock bit which utilizes electronic sensing principles. The use of electronic sensing devices provides continuous measurement of the rock bit gage through remote monitoring equipment. The sensing devices monitor the gage of the rock bit during the electron beam welding process to assure that the gage of the rock bit remains within tolerance.

8 Claims, 2 Drawing Figures

ELECTRONIC BIT GAGING

BACKGROUND OF THE INVENTION

1. Field of the Invention

The gage diameter of the rock bit determines the size of the bit and the hole which it drills and is of primary importance in the drilling art.

The gage tolerance standard set by the American Petroleum Institute (API) is the nominal gage to plus 0.031 inch for bit sizes ranging from 3⅜ to 13¾ inches and nominal gage to plus 0.062 inch for bit sizes from 14 to 17½ inches in diameter.

During drilling operations on a drill rig, the drill string is often removed from the hole to change the drill bit type or replace a dull bit. Drill bit cutters, or cones, are designed to maintain the gage diameter even as wear occurs. If the hole diameter is undergage, the following replacement bit will have to ream its way to the hole bottom before starting to drill a new hole. Conversely, the gage of the replacement bit must be within the foregoing tolerance otherwise the new bit, if it is oversize, might not pass down the hole without jamming or causing damage to the well bore. Therefore, the rock bit must be manufactured to exacting standards.

Accordingly, this invention relates to the fabrication process of rock bits with a plurality of rolling cutters wherein the gage diameters must be held within close tolerances.

More specifically, this invention relates to an electronic means to monitor the external gage dimensions of rock bits, and also the internal gage diameter of core cutting bits during the assembly and welding process wherein the bit segments, comprising legs and cones, are joined, together or to a main body, by metallurgical bonding.

2. Description of Prior Art

Prior art methods to determine the gage of rock bits have traditionally utilized gaging rings that are slipped over the gage contact points of the rock bit cutters. The bit, comprising typically three segments which contain a cone mounted on the journal of each leg, is assembled into a clamping fixture for welding.

For example, U.S. Pat. No. 3,907,191 describes a ring gage which is positioned around the assembled bit segments, the individual segments are moved relative to one another causing the parting face of an individual segment to slide against the parting face of an adjacent segment. The segments are moved until the gage cutting surfaces of the cutters physically contact the ring gage, thereby insuring that the finished bit will have the desired gage size. These segments are then subsequently welded together over a substantial portion of the parting faces.

Such a method is disadvantaged in that the preset mechanical assembly is not monitored during the welding cycle hence the segments could move and any misalignment would not be discovered until the welded assembly is subsequently inspected. A rock bit which is out of gage must be dismantled and rewelded which, of course, is a costly and time consuming process.

The instant invention overcomes this difficulty in that the welding process may be continually monitored by, for example, an electronic eddy-current sensing system. The welding process can then be immediately stopped when an out of gage condition is detected. Corrections can be made before the weld has gone beyond a point in which the rock bit must be dismantled and rebuilt.

The accuracy and reliability of an eddy-current probe system are unaffected by nonconductive dirt films, electron beam energy or a vacuum condition within the welding environment. In addition, the circular confirmity or concentricity of the rock bit cutters may be continuously and individually monitored during the complete weld cycle.

An advantage is realized over the prior art in the use of a continuous non-contact measurement system wherein both the gage dimension and bit concentricity is electronically monitored during the welding process. Radial translation of the bit segments to gage and skew to proper journal offset is possible using all the foregoing systems. True bit geometry is assured by proper journal alignment in the bit segment carriers when the bit segments are initially assembled in the weld fixture.

SUMMARY OF THE INVENTION

It is an object of this invention to provide a non-contact electronic sensing system to monitor rock bit alignment geometry during the rock bit segment welding process.

More particularly, it is an object of this invention to provide a non-contact electronic eddy-current system to monitor the bit gage, and bit concentricity for each of the bit thirds or segments in a rotatable weld fixture during the bit welding process.

A method is described which provides precise alignment geometry of a rock bit wherein the gage size and bit concentricity is determined and monitored during the bit welding process by positioning an electronic sensing system adjacent the gage of the rock bit, the sensing system is located substantially normal to the gage surfaces, the surface being substantially parallel to the axis of the bit.

The rock bit mounted to a rotatable weld fixture and spaced from the electronic sensing system is rotated about its axis, the electronic sensing systems continuously monitor the bit gage and bit concentricity during the welding process.

An eddy-current apparatus may be utilized on, for example, a three cone bit which consists of three eddy-current probes positioned at 120° locations in a circumferential housing. The gage surface of a rock bit mounted into a rotatable weld fixture is spaced to gage size from the housing or gage datum surface. The rock bit is mounted into the weld fixture on adjustable segment carriers or mounting brackets. Each bit segment translates radially, with skew, to enable the segments to be adjusted to gage with the proper journal offset. The mounting brackets hold the bit segments to a specific gage dimension determined by the calibrated eddy-current probes in the datum ring. The three eddy-current probes mounted within the circumferential datum structure are positioned to detect radial displacement of the gage contact surfaces of the rock bit. An AC voltage is provided to the eddy-current probes. The resulting high frequency magnetic flux field radiates from the tip or face of the probes into the target, in this case, the gage surfaces of the rock bit. The output signal from the probes varies in direct proportion to changes in the resulting gap between the probe face and the target. The probe signal, due to mutual induction effects, is converted to a calibrated DC millivoltage which is used as a measure of position, eccentricity, concentricity, thickness, etc. A signal driver, which is a high frequency power source, and a monitor panel are positioned remote from the series of probes adjacent the gage surfaces of the rock bit. The eddy-current system continually monitors in real time the rock bit as it is being welded by, for example, an EB (electron beam) welding machine. When welding a three cone rock bit, a rotatable weld fixture with an attached gage datum ring is indexed through 120° between each weld seam position. Since the gage contact of each cutter is continuously monitored during the welding process, the location and magnitude of any adverse change or displacement in the gage surfaces will immediately be displayed on the remote monitor panel indicators and the process may be automatically or manually stopped by the EB weld operator. Thus proper corrections are facilitated.

Once the gage tolerances and calibrations are established, the eddy-current system may be set to immediately indicate an out of tolerance condition as the rock bit is being welded. State of the art methods check tolerances of the bit after the bit is completely welded.

Therefore, an advantage over the prior art is the ability to monitor the gage of the rock bit through non-contacting means.

Another advantage over the prior art is the means in which the rock bit is monitored during the welding process.

Still another advantage over the prior art is the means in which the bit concentricity is monitored during the welding cycle.

The above noted objectives and advantages of the present invention will be more fully understood upon a study of the following detailed description in conjunction with the detailed drawings.

DESCRIPTION OF THE PREFERRED EMBODIMENTS AND BEST MODE FOR CARRYING OUT THE INVENTION

Figure 1:
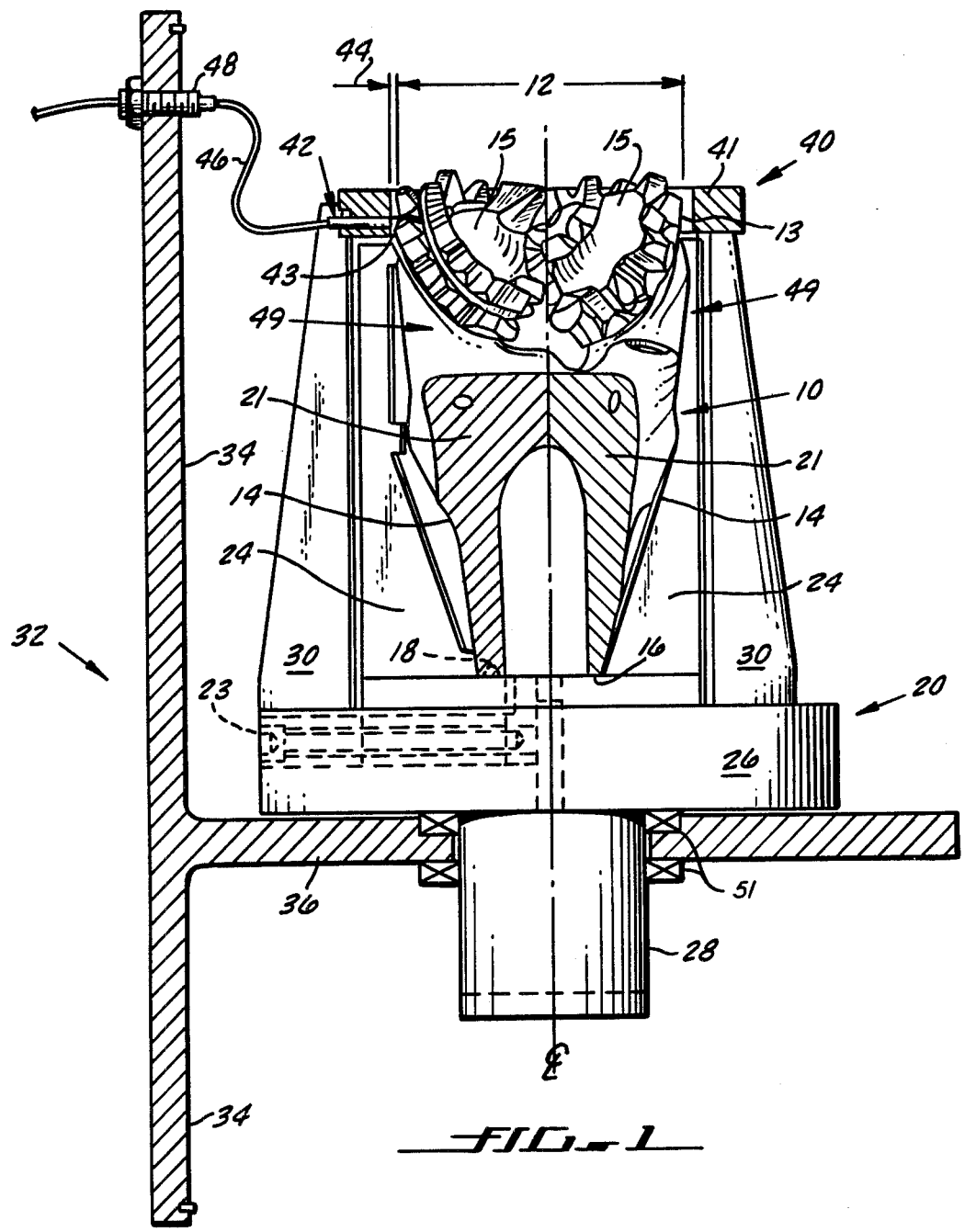
FIG. 1 is a semi-schematic, partially cut away cross-section of an eddy-current rock bit gage monitoring system.

FIG. 1 illustrates, for example, a three cone rock bit generally designated as 10 mounted to the rotary head 26 of a weld fixture generally designated as 20. The legs 14 of the three cone rock bit are engaged at their base 16 to positioning dowel pins 18. Each of the three legs 14 are moved radially with skew relative to one another causing the parting face 21 of an individual leg to slide against the parting face of an adjacent leg. The bit segments, generally designated as 49 comprising legs 14 and cones 15, are seated against adjustable bit segment carriers 24 during assembly into the weld fixture 20. The segment carriers 24 are adjustable to properly orient the rock bit within a surrounding gage datum structure 41. Once the gage diameter 12 of the bit 10 is mechanically positioned to the proper dimension, as indicated by gap dimensions 44, the fixture segment carriers 24 are locked into position. The rotary head 26 indexes the rock bit 10 to each 120° welding position to align the parting faces 21 of each of the legs 14 with, for example, the electron beam welding apparatus (not shown). An indexed drive disconnect apparatus 28 indexes the rotary head 26 to the proper position in the electron beam welding apparatus. The rotary head 26 is rotatably connected to a base plate 36 which is part of a vacuum chamber door generally designated as 32. The chamber door 32 is formed by a wall 34 which supports plate 36 which in turn supports the weld fixture 20 mounted on bearings 51. Connected to rotary head 26 are a series of vertically extending support members 30. An interchangeable size eddy-current gage measuring device, generally designated as 40, consists of an eddy-current probe support ring and datum structure 41 which is keyed to the top of the support members 30. The gage contact surfaces 13 of the cones 15 of the rock bit 10 are spaced from the datum surface of ring 41. A series of eddy-current probes 42 are precisely installed into the datum ring 41. The face 43 of each probe 42 is substantially parallel with the gage surfaces 13 of the rock bit 10. The inside surface of ring 41 is a precision gage surface. A gap 44 between face 43 and gage surface 13 can be set for gage calibration by adjusting each probe 42 to a dimension between 0.010 inch and 0.085 inch which corresponds to the desired gage gap dimension 44. A typical gap dimension for each probe is 0.040 inch. Each eddy-current probe 42 has a sensor cable 46 which is connected to external circuitry through a vacuum sealed plug-in connector 48 which is bolted through the vacuum chamber wall 34 of vacuum door 32.

Figure 2:
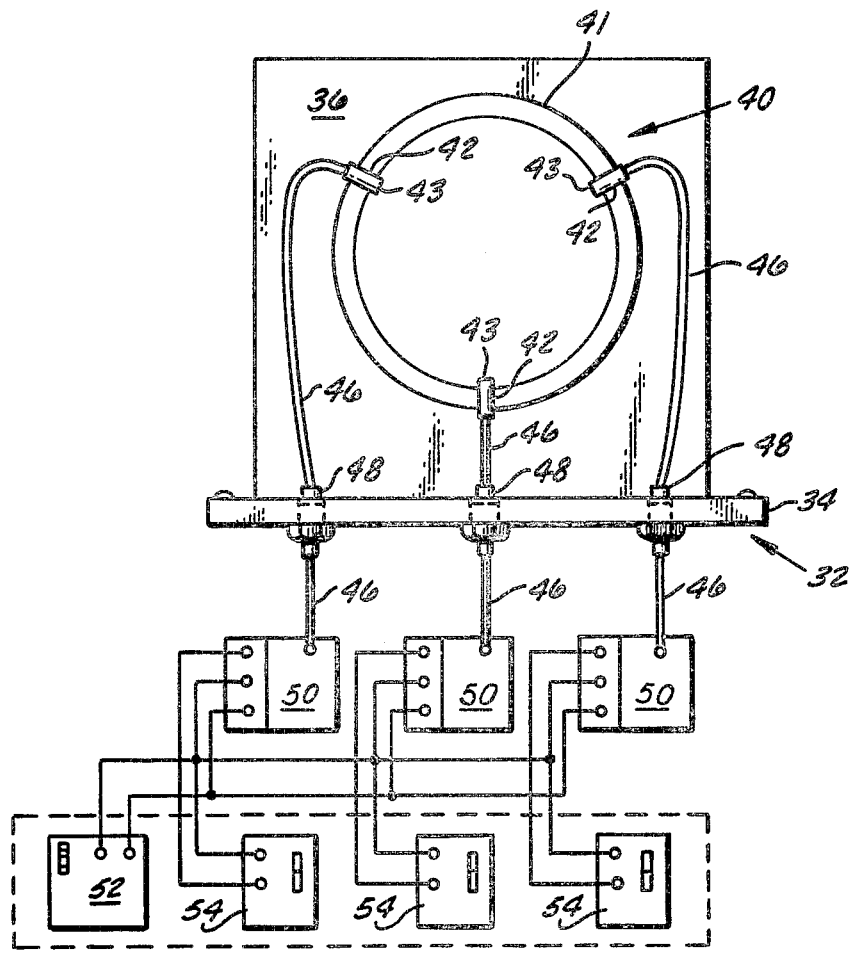
FIG. 2 is a semi-schematic plan view of FIG. 1 illustrating the eddy-current probe location, the probe driver system and the control module position indicating monitors.

Turning now to FIG. 2, this view schematically shows the position of the eddy-current probes 42 within the circular support datum structure 41. The probes are positioned in equal 120° spacing to correspond to, for example, the gage contact surfaces of a three cone rock bit. Cables 46 from each of the probes are routed through wall 34 of vacuum chamber door 32 through sealed electrical plug-in connectors 48. The cables 46 from the probes 42 are then routed through connectors 48 to a series of probe drivers 50, one for each of the eddy-current probes. The eddy-current probes are essentially a non-contacting displacement transducer, the transducer being powered by a matching probe driver 50. The preset probes constantly measure a calibrated gap dimension by producing a high frequency signal proportional to the distance of the probe tip 43 to the gage surface 13. The eddy-current probe driver is the high frequency power source for the eddy-current probes. The high frequency signal is converted to a proportional DC voltage at the position monitor for display on the calibrated indicator. Power for the probe drivers is supplied by a power supply/control module 52. Module 52 serves as both the power source and main control panel for the entire system 40. A series of single-channel position monitors 54, one each for each of the eddy-current probes 42, provide a means to indicate the actual position or the average target surface position of a moving part, such as the gage contact surface 13. Input signals for the position monitors 54 are obtained from the eddy-current probes and their drivers 50. Monitoring is continuous and can also be used to actuate, for example, alarms automatically when the position exceeds preset limits. For example, if the gage surface goes out of a set tolerance range then the eddy-current probes and their attendant drivers and position monitors will immediately alert the Electron Beam Weld Operator so that the procedure may be shut down and the cause of the problem located.

The foregoing components, i.e., probe 42, driver 50, power supply and control module 52, and the position monitors 54 are, for example, supplied by DIMAC, a division of SPECTRAL DYNAMICS OF San Diego. The DIMAC part designations are as follows: the eddy-current probe 42 is M61, the driver 50 is M606, the power supply and control module 52 is M704, and the single-channel position monitor 54 is M703.

The cylindrical gage datum surface 41 is positioned adjacent the cutters 15 of the rock bit 10 so that the bit gage displacement can be referenced. The eddy-current probes 42 produce a high frequency magnetic flux but since the flux is alternating and localized in iron away from the weld seams, a steady state leakage flux density limit of approximately one gauss per bit segment will not be exceeded and should not cause tracking or focus problems for the electron beam welding apparatus. The accuracy of probes 42 is unaffected by non-conductive dirt films, electron beam energy or vacuum. Screw adjustment (not shown) is provided for eddy probe calibration. The concentricity of the bit 10 can be monitored during the complete weld cycle.

Referring again to FIG. 1, once the rock bit 10 is centered within the indexing rotary head 26 by screw adjustments 23, the gage surface 13 is then monitored during the entire welding process, giving an instantaneous readout which can be visually referenced through each of the three position monitors 54. Thus, any deviation will be instantly recognized and corrections can be implemented at that time.

The foregoing eddy-current system could obviously be used to monitor the internal gage diameter of a core cutting rock bit during the welding process. The eddy-current probes would be mounted to a gage datum ring fixed to the weld fixture, the datum structure being positioned within the core opening in the core cutting rock bit (not shown).

It will, of course, be realized that various modifications can be made in the design and operation of the present invention without departing from the spirit thereof. Thus, while the principal preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. An apparatus which provides precise alignment geometry of a two or more leg segment rock bit wherein the gage size and rock bit concentricity is monitored by non-contacting means during the rock bit welding process comprising:
   a rotatable weld fixture having means for mounting said rock bit thereto, said fixture being adjustable to axially align said rock bit with said fixture,
   a fixed datum structure mounted to said weld fixture, said datum structure being positioned to be spaced from the gage surface defined by said rock bit,
   a plurality of electronic gage sensing means mounted to said datum structure, each adapted to face a gage surface of said rock bit and comprising an eddy-current probe, the discharge face defined by said probe being substantially parallel with the axis of said rotatable weld fixture, and
   means to remotely monitor said plurality of electronic gage sensors during said welding process.

2. The invention as set forth in claim 1 wherein said fixed datum structure is a ring concentric with the axis of said rotatable weld fixture.

3. The invention as set forth in claim 2 wherein said rock bit is a three cone rock bit.

4. The invention as set forth in claim 3 wherein said eddy-current probes are positioned in said ring at about the 120° position, one from the other, in said ring each probe being adjacent the gage surface of each cone of said three cone rock bits.

5. The invention as set forth in claim 4 wherein the gap distance from said discharge face of said eddy-current probes and said gage surface defined by said rock bit is between 0.010 inch and 0.085 inch, any change in the gap constant is immediately detected in said remote monitoring means during said welding process.

6. The invention as set forth in claim 5 wherein the gap distance is about 0.040 inch.

7. The invention as set forth in claim 1 wherein said electronic sensing means is mounted to a fixed datum structure mounted to said rotatable weld fixture said electronic sensing means serves to remotely monitor an internal gage diameter defined by a core cutting rock bit during said welding process.

8. An apparatus which provides precise alignment geometry of a three cone rock bit wherein the gage size and rock bit concentricity is monitored by non-contacting means during the rock bit welding process comprising:
   a rotatable weld fixture having means for mounting said rock bit thereto, said fixture being adjustable to axially align said rock bit with said fixture,
   a fixed datum ring structure mounted to and concentric with said weld fixture,
   three eddy-current probes mounted to said datum ring structure, the discharge face defined by said probe being positioned to be adjacent a gage row of each cone of said rock bit and being substantially parallel with the axis of said rotatable weld fixture, and
   eddy-current probe monitoring means remote from said weld fixture to monitor the gage and concentricity of said three cone rock bit during said welding process.

* * * * *